(12) United States Patent
Sherman et al.

(10) Patent No.: US 7,681,963 B2
(45) Date of Patent: Mar. 23, 2010

(54) BRAKING SYSTEM FOR A LIFT TRUCK

(75) Inventors: Daniel L. Sherman, Minster, OH (US); Joe K. Hammer, St. Marys, OH (US)

(73) Assignee: Crown Equipment Corporation, New Bremen, OH (US)

( * ) Notice: Subject to any disclaimer, the term of this patent is extended or adjusted under 35 U.S.C. 154(b) by 296 days.

(21) Appl. No.: 11/369,468

(22) Filed: Mar. 7, 2006

(65) Prior Publication Data

US 2006/0273656 A1    Dec. 7, 2006

Related U.S. Application Data

(60) Provisional application No. 60/659,130, filed on Mar. 7, 2005.

(51) Int. Cl.
*B60T 8/62* (2006.01)
(52) U.S. Cl. ............. 303/189; 303/113.2; 303/139; 188/106 P; 180/197
(58) Field of Classification Search ............ 303/89, 303/189, 3, 20, 113.2, 139, 148, 149, 151, 303/152; 188/106 F; 701/70, 50
See application file for complete search history.

(56) References Cited

U.S. PATENT DOCUMENTS

| 3,848,692 | A | * | 11/1974 | Messner et al. ............. 180/253 |
|---|---|---|---|---|
| 4,265,337 | A | * | 5/1981 | Dammeyer .................. 187/224 |
| 4,598,797 | A | * | 7/1986 | Schultz ........................ 187/223 |
| 5,145,238 | A | * | 9/1992 | Strenzke et al. ................ 303/10 |
| 5,205,620 | A | * | 4/1993 | Dammeyer et al. ......... 303/155 |
| 5,573,312 | A | * | 11/1996 | Muller et al. ................... 303/3 |
| 5,687,081 | A | * | 11/1997 | Wellman et al. .............. 701/50 |
| 6,236,927 | B1 | * | 5/2001 | Sherman ....................... 701/70 |
| 6,782,961 | B1 | * | 8/2004 | Ishikawa et al. ............ 180/197 |
| 7,275,794 | B2 | * | 10/2007 | Huther et al. ................... 303/3 |
| 7,287,625 | B1 | * | 10/2007 | Harris ........................ 187/282 |
| 2004/0195911 | A1 | | 10/2004 | Huther et al. |

FOREIGN PATENT DOCUMENTS

DE    103 38 706 A1    3/2004

* cited by examiner

*Primary Examiner*—Robert A Siconolfi
*Assistant Examiner*—Mariano Sy
(74) *Attorney, Agent, or Firm*—Stevens & Showalter LLP (57) ABSTRACT

A braking system for a lift truck performs all service braking using truck traction drive motors. Mechanical, spring applied, electrically released brakes are coupled to wheels on opposite sides of the truck with the mechanical brakes applying unequal braking forces to the wheels. The mechanical brakes perform park braking and, in the event an electrical system problem arises, backup braking as well that can be modulated by an operator of the truck regardless of the operating condition of the truck.

24 Claims, 5 Drawing Sheets

BRAKING SYSTEM FOR A LIFT TRUCK

This application claims the benefit of U.S. Provisional Patent Application No. 60/659,130 filed Mar. 7, 2005 and entitled BRAKING SYSTEM FOR A LIFT TRUCK which is incorporated herein by reference in its entirety.

BACKGROUND OF THE INVENTION

The present invention relates to lift trucks in general and, more particularly, to a braking system for a lift truck that permits simplified braking structure, elimination of replacement of brake wear components, improved operator comfort and improved lift truck stability during braking. While the present invention may be utilized on a variety of materials handling vehicles, it will be described herein with reference to a counterbalanced lift truck for which it is particularly applicable and will initially be used.

Oftentimes, lift trucks, particularly standup lift trucks, utilize a "black and white" or on/off spring applied/electrically released brake arrangement to provide both service brakes (brakes for slowing or decelerating a truck while moving) when an operator makes a pedal brake request, and also for parking brakes (brakes applied to immobilize a stopped truck). In these lift truck braking systems, limited modulation may be available by gradual application of the brake pedal and/or by pulsing the brake pedal to turn the brake on and off to thereby control the stopping distance. Further, the braking force applied by these braking systems typically is the same regardless of fork height and/or load carried by the forks. Furthermore, in these braking systems, during a "fault" condition within the truck control system, even the ability to modulate the brakes by pulsing the brake pedal is not available since full braking torque is applied regardless of whether the brake pedal is operated or not. Unfortunately, when a truck is operating with its forks elevated and particularly when the elevated forks support a load, full braking torque can result in an unstable condition.

Accordingly, there is a need for an improved braking system that addresses the noted properties in existing lift truck braking systems. Preferably, the improved braking system would provide substantially all service braking using regenerative or regen braking by appropriate control of motors used to drive the truck so that during braking, power is generated in the motors and conducted to the power system of the lift truck. In this way, operating times for the truck could be extended, mechanical braking systems used for parking and backup braking could be simplified and these braking systems normally would not require replacement or adjustment of wear components during the entire useful life of the lift truck. In addition, the mechanical brakes provided for parking and backup braking would be controlled so that an operator of the truck could modulate these brakes to improve stability of the truck during electrical system problems.

SUMMARY OF THE INVENTION

This need is satisfied by the invention of the present application which discloses a braking system for a lift truck wherein all service braking is performed using truck traction drive motors. Mechanical, spring applied, electrically released brakes are coupled to wheels on opposite sides of the truck with the mechanical brakes applying unequal braking forces to the wheels. The mechanical brakes perform park braking and, in the event an electrical system problem arises, backup braking regardless of the operating status of the truck.

In accordance with one aspect of the present invention, a lift truck comprises a first wheel located on a first side of the truck and a second wheel located on a second side of the truck opposite from the first side. A first brake is associated with the first wheel and a second brake is associated with the second wheel. The first brake applies a first braking force brake to immobilize the truck and the second brake applies a second braking force to immobilize the truck, the first braking force and the second braking force being unequal to one another.

In accordance with another aspect of the present invention, a method for operating a lift truck having first and second wheels located on first and second sides of the truck, respectively, a first brake associated with the first wheel, a second brake associated with the second wheel, an operator controlled service brake request device, a mast assembly along which forks are raised and lowered, and a mast height sensor comprises: applying a first braking force with the first brake to immobilize the truck; and applying a second braking force with the second brake to immobilize the truck, the first braking force being unequal to the second braking force.

BRIEF DESCRIPTION OF THE DRAWINGS

The following description of the preferred embodiments of the present invention can be best understood when read in conjunction with the following drawings, where like structure is indicated with like reference numerals, and in which.

DETAILED DESCRIPTION OF THE INVENTION

Figure 1:
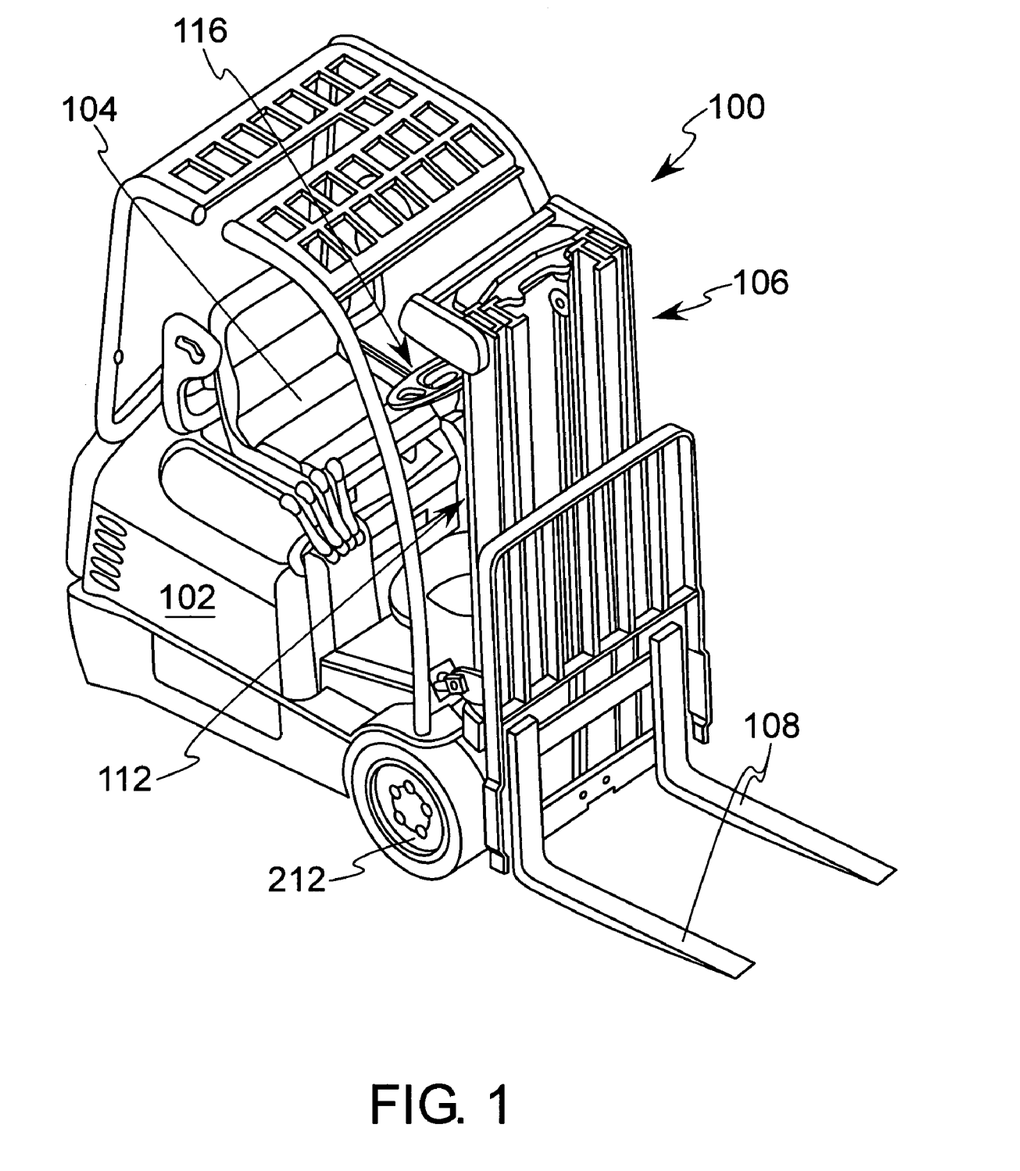
FIG. 1 is a perspective view of a sit-down counterbalanced lift truck including the invention of the present application.
Figure 2:
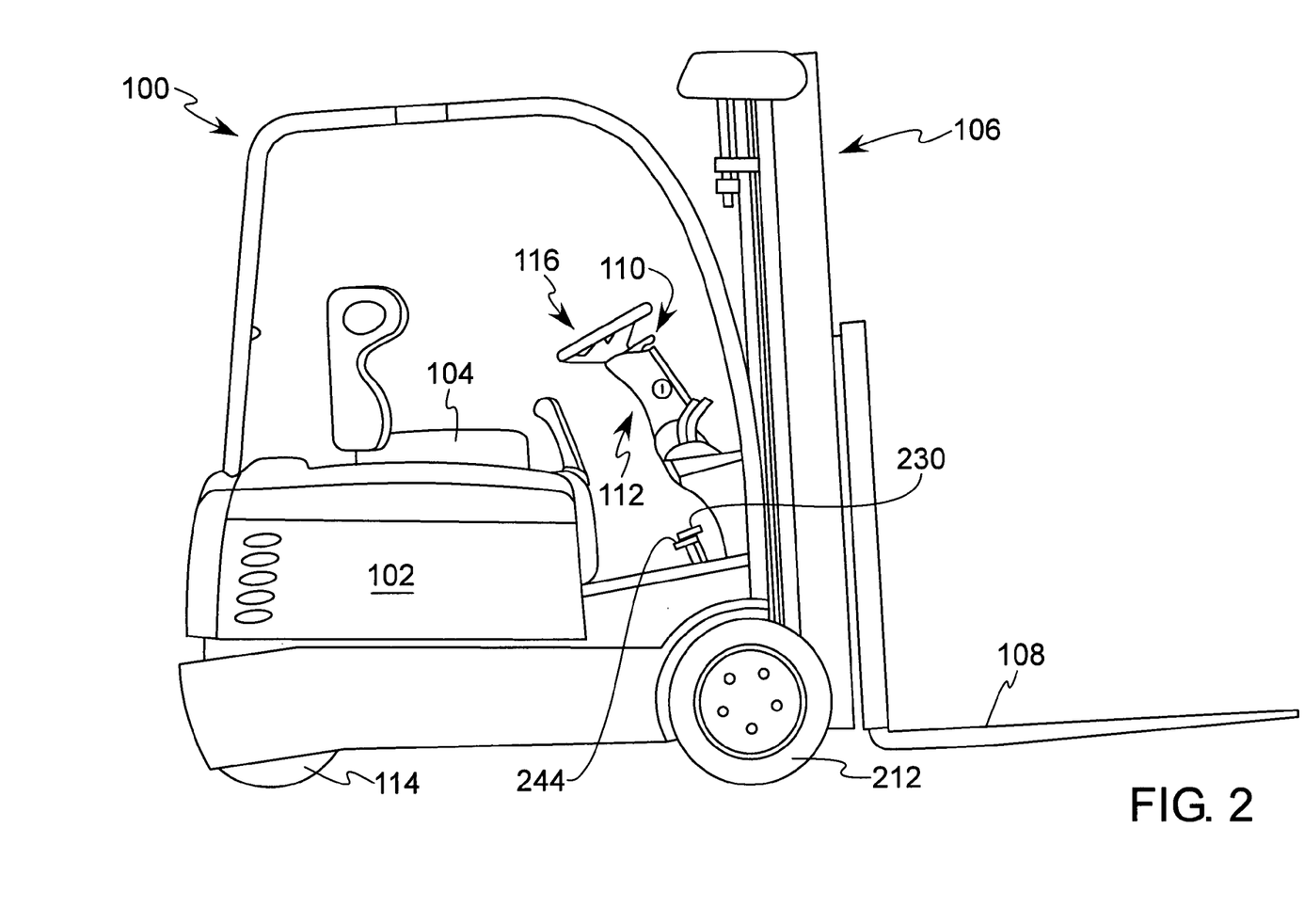
FIG. 2 is a side plan view of the counterbalanced lift truck of FIG. 1.
Figure 5:
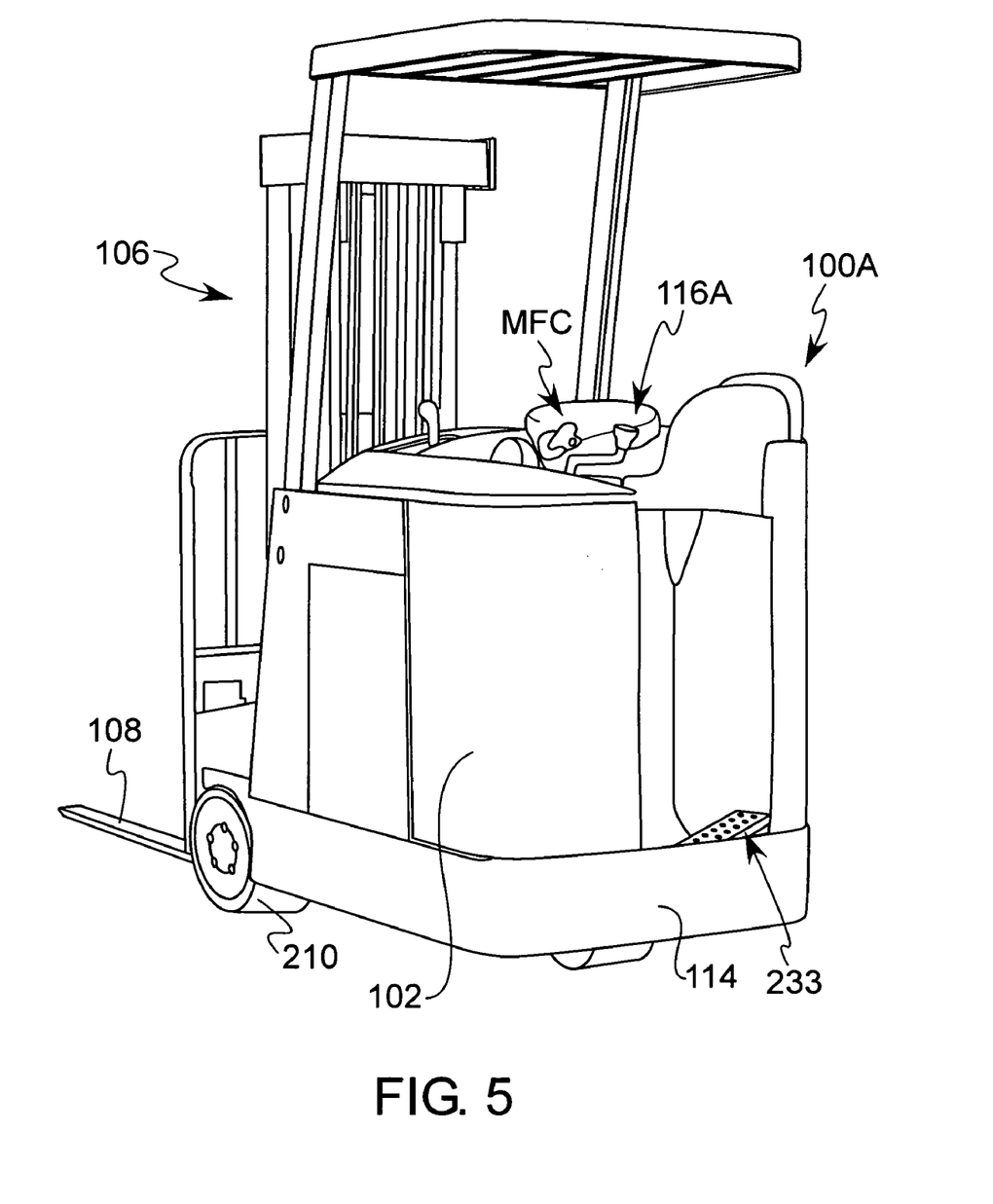
FIG. 5 is a perspective view of a standup counterbalanced lift truck including the invention of the present application.

Reference is made to FIGS. 1 and 2 which are perspective and side plan views, respectively, of a three-wheel sit-down counterbalanced lift truck 100 for which the invention of the present application will initially be used. While the present invention is described herein with reference to the sit-down counterbalanced lift truck 100, it will be apparent to those skilled in the art that the invention and variations of the invention can be more generally applied to a variety of other materials handling vehicles including, without limitation, a three-wheel standup lift truck 100A shown in FIG. 5. Components that can be used to implement the invention of the present application on the lift trucks 100, 100A are illustrated schematically in FIG. 3 and also are identified in FIGS. 1, 2 and 5 to the extent these components are visible in FIGS. 1, 2 and 5. It is contemplated that other components and component configurations can be used for the present invention so that the invention is not to be limited to these components.

A closed loop dual traction motor controller 200, sometimes referred to as a traction control module, located within a power unit 102 of the truck 100, 100A contains power electronics to control a left drive motor 202 and a right drive motor 204 independently of each other in both braking and motoring modes of operation. In a working embodiment of the invention, one of a number of commercially available controllers was used for the motor controller 200. The dual traction drive motors, i.e., the left drive motor 202 and the right drive motor 204, are coupled to independent gearboxes 206, 208, respectively, to drive a left drive wheel 210, see FIG. 5, and a right drive wheel 212. In a working embodiment of the invention, the left and right drive motors 202, 204 comprise three phase AC induction motors; however, the present invention is not limited to AC motor technology as will be apparent. The present invention can also be used for lift trucks that are driven by a single drive motor instead of dual drive motors and individual drive controllers can be used for the left and right drive motors 202, 204, if desired. For control of the AC drive motors 202, 204, independent feedback encoders 214, 216 are used to monitor the rotational speed and direction of the AC drive motors 202, 204, respectively.

A mechanical, spring applied, electrically released first brake 218 is coupled to the left drive motor 202 to provide a percentage or fraction X of a total mechanical braking force 100% or 1 that is used for parking and backup braking of the truck 100, 100A. While X can be within a range of fractions, ⅓ of the total mechanical braking force was used in a working embodiment of a truck including the invention of the present application. A mechanical, spring applied, electrically released second brake 220 is coupled to the right drive motor 204 to provide a fraction Y of the total mechanical braking force 1 that is used for parking and backup braking of the truck 100, 100A. The fraction Y is complementary to the fraction X so that the total or 100% of the braking 1 required for parking and backup purposes is provided when both of the brakes 218, 220 are operated, i.e., X+Y=1. Since X was ⅓ in the working embodiment of the truck noted above, Y was ⅔. Other fractional divisions can be used in the present invention with the selection of appropriate fractions being based, for example, on vehicle geometry and minimizing truck skewing. The spring applied, electrically released brakes can be more directly coupled to wheels mounted on opposite sides of a lift truck as would be required for a lift truck having a single drive motor.

A brake logic control module 222, that is independent of the traction motor controller 200, includes fail safe driver circuitry by providing power to the first brake 218 using a first pair of drivers (not shown) that are connected to the first brake 218 through a first pair of conductors 224 and providing power to the second brake 220 using a second pair of drivers (not shown) that are connected to the second brake 220 through a second pair of conductors 226. By providing pairs of drivers and conductors, i.e., separate control for each of the positive and negative power leads, if the control or conductor path for either polarity of power is interrupted, the corresponding mechanical brake cannot be electrically released through the interrupted control/power path and hence the associated brake will be applied by spring action.

The presence of an operator in a truck is detected by an operator attend or presence sensor 228. In the truck 100, the operator presence sensor 228 can be a conventional operator detector switch (not shown) that is actuated when an operator sits in a seat 104 of the truck 100 with the operator present signal generated by the switch being passed to the traction motor controller 200 and the brake logic control module 222 via conductors 229. Instead of using hard wiring to interconnect the traction motor controller 200 and the brake control module 222, in vehicles utilizing Controller Area Network (CAN) communication technology, the traction motor controller 200 and the brake control module 222 can share common information via a CAN bus 231. In stand-up trucks, such as the truck 100A shown in FIG. 5, the operator presence sensor 228 can be a conventional switch (not shown) associated with a foot pedal 233 that must be engaged by the operator for truck operation. Other presence sensing arrangements and devices, such as Hall effect devices, capacitance sensing devices, proximity detectors and the like, can also be used as an operator presence sensor in the present invention. The brake logic control module 222 can be constructed using a wide variety of electrical and/or electronic components as will be apparent to those skilled in the art from a review of this disclosure and therefore will not be described in detail herein.

Operator requests for service braking are generated by two independent sensing devices that are associated with a brake requesting device, such as a brake lever or a service brake pedal 230 as illustrated. Depending upon lift truck design, the brake pedal can be pressed to request braking or released to request braking. For the sit-down counterbalanced lift truck 100, the brake pedal 230 is pressed to request braking while on stand-up lift trucks, such as the truck 100A of FIG. 5, the brake pedal is held down for operation of the truck and released to request braking. As illustrated, a first brake sensing or request device 232 generates an analog signal that is conducted to the traction motor controller 200 via a conductor 234 to request proportional braking with the magnitude of the analog signal corresponding to the position of the service brake pedal 230. For example, the first brake request device can be a potentiometer. Other devices can be used to generate an analog signal and digital devices, such as encoders, can be used to generate a signal that corresponds to or can be processed to correspond to the position of the brake pedal as will be apparent to those skilled in the art.

As illustrated, a second brake request device 236 generates an on/off signal that requests braking with the on/off signal being conducted to the traction motor controller 200 and to the brake logic control module 222 via conductors 238. While a variety of devices that directly generate an on/off signal or signals that can be processed to generate an on/off signal can be used for the second brake request device, for cost and reliability purposes, a normally open switch is currently preferred for the second brake request device 236.

A mast height sensor 240 is associated with the mast assembly 106 to detect the height to which the mast assembly 106 has been raised. The mast height sensor 240 can be a system that monitors the height of the truck mast and/or forks 108 as they are raised using, for example, one of a number of known encoder arrangements. Alternately, the mast height sensor 240 can be a switch that indicates whether the mast is below or above a staged height at which the mast assembly begins to raise after the forks 108 have reached a free lift height. A variety of analog and digital mast height sensors, staging switches and associated operating systems are well known in the art of materials handling vehicles. In a working embodiment of the invention, a staging switch was used for the mast height sensor 240. Signals from the mast height sensor 240 are conducted to the traction motor controller 200 and to the brake logic control module 222 via conductors 242. Instead of using hard wiring, vehicles utilizing CAN communication technology can share height sensor information via the CAN bus 231.

An operator of the truck 100 can control truck speed using an accelerator 244 that can be controlled by actions of the operator's feet or hands, depending on the truck design. In the truck 100, the foot operated accelerator 244 is used. The direction of the truck 100 is controlled using a forward switch 246 and a reverse switch 248 that can be operated using a lever 110 on the steering column 112 or otherwise, such as through a multifunction controller (MFC) as used on many lift trucks and illustrated in the truck 100A of FIG. 5. A line contactor 250 is used to connect power from a battery 252 to the traction motor controller 200 and thereby control connection and disconnection of all traction motor power to the traction motor controller 200. A steering angle sensor 254 is associated with a third wheel 114 in a known manner to detect the steering angle of the third wheel 114 that is controlled by rotation of the steering wheel 116 of the truck 100 or the tiller 116A of the truck 100A. A toggle or other appropriate device, illustrated as a key switch 256, must be turned on to power up the truck 100, 100A for operation.

With reference to the above description, the inventive braking system of the present application will be further described. The braking system utilizes the traction motors, i.e., the left and right drive motors 202, 204, for all conventional service braking functions. Mechanical, spring applied, electrically released brakes, i.e., the first and second brakes 218, 220, are attached to each drive train for parking brake purposes and to provide backup braking in the event an electrical system problem arises. The combined torque of the first and second brakes 218, 220 will meet all parking brake requirements outlined in ASME B56. Since the braking system of the present application can be used on counterbalanced vehicles, whose stability can be compromised by changes in the load center and the travel direction, the braking system provides the operator with command over when and how much braking force is necessary to bring a vehicle to a controlled stop even in situations where the traction controller may have a problem. The braking system of the present application differs greatly from previous applications of spring applied brakes where, in the event of a truck problem, full braking is applied without an operator's request or control and this full braking could possibly result in operator discomfort and an unstable vehicle.

Service brake controlled deceleration requested by the service brake pedal 230 can be proportional to the operator's request or pedal position. Alternately, service brake controlled deceleration can be performed in steps, again defined by the operator's request or pedal position. To provide smoother service braking, it is currently preferred to provide proportional braking, however, stepped service braking is contemplated for the present invention. The signals generated by the brake pedal 230 are "learned" or calibrated for 0% and 100% of brake command. This learning operation is conventional and is performed by reading and storing signals generated by the first brake request device 232 when the brake pedal 230 is fully released and fully depressed, i.e., 0% and 100% activation, respectively. The braking control can be tuned by selecting a minimum level of braking corresponding to a 1% braking request signal and a maximum level of braking corresponding to a 100% braking request signal. For the currently preferred proportional braking control, all positions of the brake pedal 230 between these two extremes will result in a proportional braking response that is between the selected minimum braking and the selected maximum braking. For stepped braking, various positions of the brake pedal 230 can be used to select the available steps or one or more switching devices can be associated with the brake pedal 230 to define the steps.

Many lift truck operators have become accustomed to decelerating or braking a truck by what is commonly referred to as inversion, plug, regenerative or regen braking, referred to herein as inversion braking, wherein power is extracted from the motors and passed to the electrical system. Inversion braking is performed by changing the requested travel direction of the truck to the direction that is opposite to the actual travel direction of the truck by operating the forward switch 246 if the truck is traveling in reverse or by operating the reverse switch 248 if the truck is traveling forward. Inversion braking the truck 100 is controlled using the accelerator 244 after the appropriate one of the forward and reverse switches 246, 248 has been operated while inversion braking of the truck 100A is controlled using the multifunction controller (MFC).

In the truck 100, the foot-operated accelerator 244 operates a device that generates a signal proportional to the position of the accelerator 244 or a signal that can be processed to indicate the position of the accelerator 244, for example, a traction potentiometer 244P is illustrated to provide proportional signals for inversion braking. For proportional inversion braking, the position of the accelerator 244 defines the amount of braking that the traction motor controller 200 generates by braking action of the drive motors 202, 204. The operating range of the accelerator 244 is learned by measuring and recording signals generated by the traction potentiometer 244P when the accelerator 244 is released and fully depressed so that the accelerator positions are learned or calibrated for 0% and 100%, respectively. Like the first brake request device 232, the braking control of the accelerator 244 can be tuned by selecting a minimum level of braking corresponding to a 1% brake request signal generated by just operating the accelerator 244 and a maximum level of braking corresponding to a 100% brake request signal generated by fully depressing the accelerator 244. All positions of the accelerator 244 between these two extremes will result in a proportional deceleration or braking response that is between the selected minimum and maximum braking. The direction of the truck 100 is controlled using the forward switch 246 and the reverse switch 248 that can be operated using the lever 110 on the steering column 112 or otherwise, such as through a multifunction controller (MFC) as used on many lift trucks and illustrated on the truck 100A.

Thus, an operator may decelerate or brake the truck 100 when traveling in the forward direction by operating the reverse switch 248 using the lever 110 and select the amount of braking by use of the accelerator 244 that positions the travel potentiometer 244P. Likewise, the truck 100 traveling in the reverse direction can be decelerated by operating the forward switch 246 using the lever 110 and selecting the amount of braking by using the accelerator 244 that positions the travel potentiometer 244P. For the truck 100A, both direction and speed are controlled using the MFC. In instances where simultaneous requests for both pedal braking and inversion braking are present, the traction motor controller 200 compares the requests to determine which request will result in the maximum braking force and then provides the maximum requested braking force.

Control theory varies depending on the type and manufacturer of the traction controller that is used. For the commercially available controller that was used as the traction motor controller 200 for a working embodiment of the present invention, the control theory used is referred to as a closed loop frequency/time or speed/time control, which means that the truck speed in frequency or rpm is slewed from a given frequency or rpm at a time t minus 1 (t−1) to 0 frequency or 0 rpm (0 speed of the truck) at a time t with the slew rate being a function of pedal position (brake or accelerator as described above). The controller can be tuned by setting a time period for minimum deceleration (1%), a minimum deceleration rate, and a time period for maximum deceleration (100%), a maximum deceleration rate, and braking at or anywhere between the minimum and maximum deceleration rates based on the percentage of braking that is requested. When using the AC drive motors 202, 204, slip or torque is controlled to approximately maintain the corresponding or targeted deceleration rate that is selected by the requested braking. An example of operation of this control theory will now be provided.

For this example, the minimum pedal braking request signal (1% braking request signal) is selected or tuned to a deceleration rate of 100 Hz in 8.0 seconds, i.e., 100 hertz of frequency will be reduced to 0 hertz of frequency in 8.0 seconds. The maximum pedal braking request signal (100% braking request signal) is selected or tuned to a deceleration rate of 100 Hz in 1.0 second, i.e., 100 hertz of frequency will be reduced to 0 hertz of frequency in 1.0 second. For this example, an operator has the brake pedal (or accelerator) about half way depressed between its fully released and fully depressed positions so that a brake request signal of 50% is generated as the braking command. Under the brake tuning parameters set above, the 50% brake request signal results is a deceleration time of (8.0−1.0)*50%=3.5 seconds for every 100 Hz of motor speed. Presuming that the vehicle is traveling at 8.0 mph or 150 Hz, it will take 150/100*3.5=5.25 seconds to come to a stop resulting in an average deceleration of 0.07 g's and an approximate stopping distance of 30.8 feet. While those skilled in the art will understand this control operation, for further understanding, reference can be made to the DUA-LAC2 INVERTER OPERATING HANDBOOK AND FUNCTION DESCRIPTION provided for operation of a ZAPI DUALAC2 inverter which is incorporated herein by reference.

Theoretically, if the capacity of the electrical controls, the capacity of the motor drivers and the size of the AC drive motors 202, 204 are adequate, a fully loaded truck and an empty truck would stop in the same time and distance from the same initial speed at the same deceleration rate or g force. The actual resulting torque or braking force will be a function of the vehicle weight and grade of the surface on which the truck is operating.

The brake logic control module 222 controls the parking brakes, i.e., the mechanical first and second brakes 218, 220. As noted above, each of the brakes 218, 220 has independent redundant drivers and conductors which control both the positive and negative legs of the brake release coils.

Figure 3:
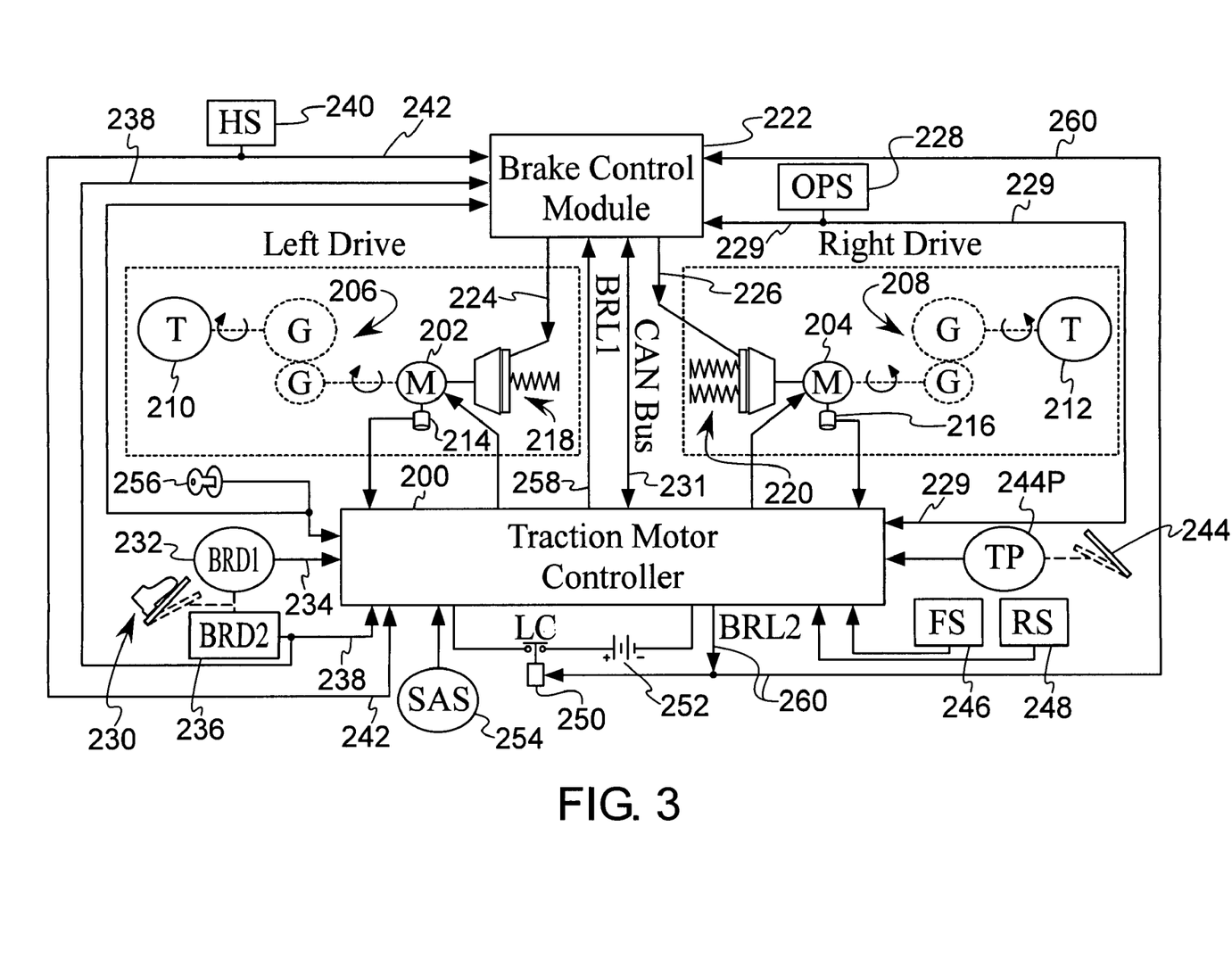
FIG. 3 is a schematic view of illustrative components that can be used to implement the invention of the present application.

The traction motor controller 200 also provides duplicate or redundant brake release enable signals to the brake logic control module 222. More particularly, as shown in FIG. 3, the traction motor controller 200 provides a first brake release (BRL1) enable signal to the brake logic control module 222 over a conductor 258 and a second brake release (BRL2) enable signal to the brake logic control module 222 over a conductor 260. The loss of either brake release enable signal, BRL1 or BRL2, results in conditionally controlled application of the mechanical brakes 218, 220. Vehicles utilizing CAN communication technology provide the same level of protection via the CAN bus 231 by requiring that a brake release CAN message be present, thus replacing both brake release enable signals BRL1 and BRL2 and the associated wiring.

Circuitry within the brake logic control module 222 requires that both traction control brake release enable signals BRL1, BRL2, or the brake release CAN message be present and that an operator be present in the truck 100, 100A, as indicated by the operator present signal generated by the operator presence sensor 228, before the parking brakes, the mechanical first and second brakes 218, 220, are released. The traction control module 200 activates the parking brakes, the mechanical first and second brakes 218, 220, after the truck 100, 100A has come to a stop for a period of time and no travel has been requested during that period of time. In a working embodiment, the parking brake was applied as a two step process. A first delay to parking brake time period, for example three seconds, and a second delay to parking brake time delay, for example six seconds. It is noted that other parking brake delay times can be used in the present invention.

Figure 4:
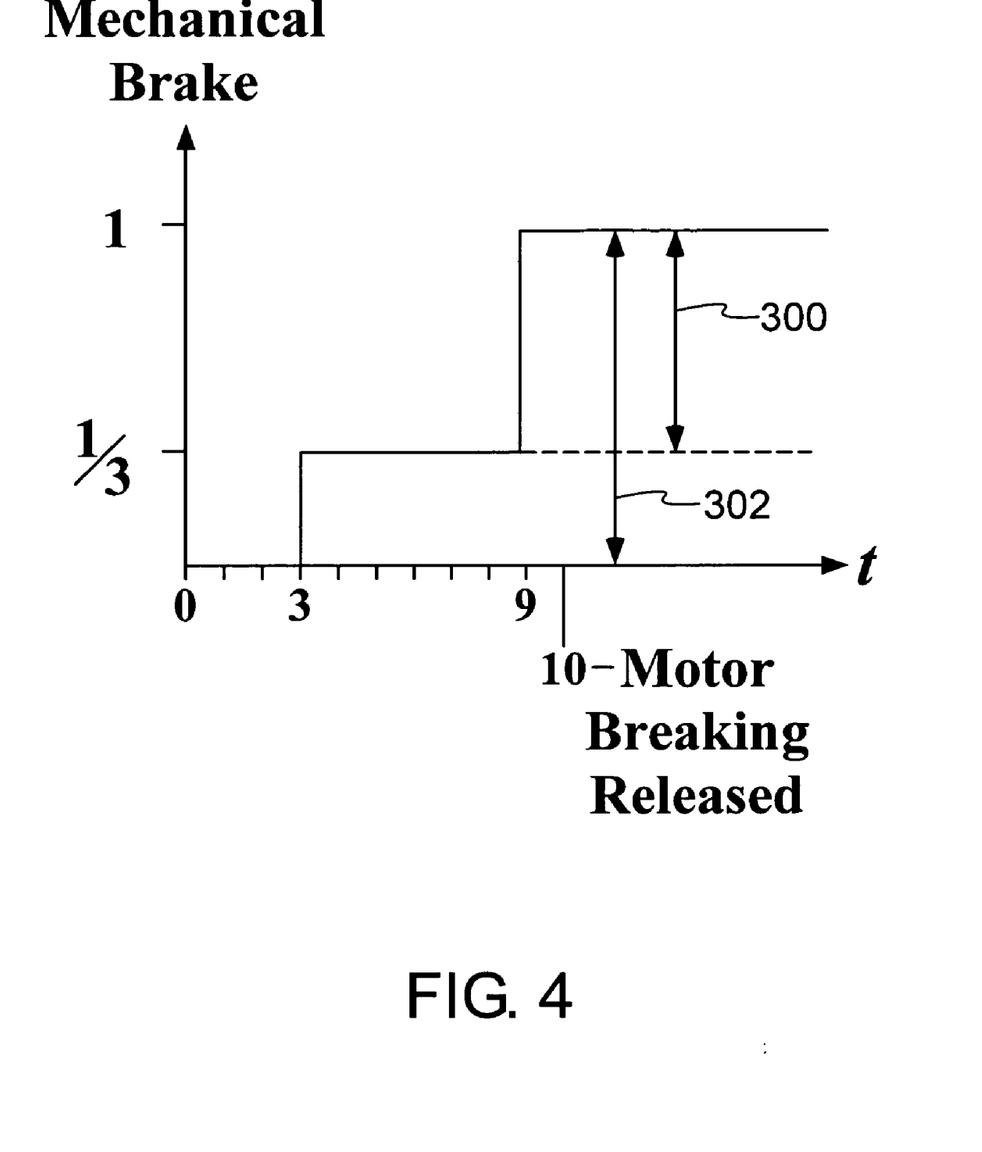
FIG. 4 is a diagram illustrating parking brake application after the lift truck is stopped and brake modulation when one or both traction control brake release enable signals are lost.

As shown in FIG. 4, when the first delay to parking brake time period of three seconds has elapsed after the truck 100, 100A has stopped and no further travel has been requested, the first brake 218 is applied to generate ⅓ of the total parking brake force available as illustrated. When the second delay to parking brake time period of six seconds has elapsed after the application of the first brake 218, i.e., a total time delay of nine seconds has elapsed, the second brake 220 is applied to generate or add ⅔ of the total parking brake force available as illustrated. The traction control module 200 holds the vehicle at zero speed using the AC drive motors 202, 204, for an additional one second after the total parking brake has been applied by application of the first and second brakes 218, 220 to ensure that the parking brakes are fully applied before motor braking is released.

If either one or both of the traction control brake release enable signals BRL1, BRL2 is removed or if the brake release CAN message is missing for what ever reason, either intentionally or due to an electrical failure, the first brake 218, i.e., the fractional, ⅓ brake as illustrated, is immediately applied as long as the forks 108 are not elevated above staged lift height as indicated by signals from the mast height sensor 240 that are conducted to the brake logic control module 222 via the conductors 242. In the working embodiment of the present invention, ⅓ braking was chosen for the first brake 218 because it decelerates the truck 100, 100A at a low rate, approximately three times the rolling resistance of the truck 100, 100A, to reduce the possibility of unstabilizing the truck and making the operator feel uncomfortable on the truck due to the rate of deceleration. ⅓ braking was also selected for the first brake 218 because it also minimizes the skew effects of applying braking torque to only one of the left and right drive wheels, 210, 212. Thus, in the event of a system problem, the fractional ⅓ brake is immediately applied and begins to decelerate the truck at a comfortable level even before the operator may realize that there is a problem, thereby anticipating operator action and eliminating a portion of time ordinarily required for operator reaction. Also, for the braking system of the present application, the operator reacts in a normal truck operating manner without having to reach for a parking brake lever or button that is normally not used while operating the truck thus eliminating the time required to perform this secondary and probably unfamiliar operation.

The operator requesting any level of service braking while either one or both of the traction control brake release enable signals BRL1, BRL2, is not present or if the brake release CAN message is missing, results in full parking brake torque being applied regardless of fork height. Thus, if the fork height is below staging height, the operator can manually modulate the braking torque between ⅓ and ⅔ of the full parking brake force, see 300 in FIG. 4; and, if the fork height is above staging height, the operator can manually modulate the braking force between 0 and ⅔ of the full parking brake force, see 302 in FIG. 4. Thus, unlike in prior art lift trucks, the operator can manually modulate the braking torque to bring the vehicle to a stop regardless of the operating status of the truck.

After a predetermined time period, in the illustrated embodiment six seconds, if either of the traction control brake release enable signals BRL1, BRL2, is absent or if the brake release CAN message is missing, the brake logic control module 222 applies both parking brakes if the forks are below staging height. If the forks are above staging height, the parking brakes will not be applied and braking will be entirely under the control of the operator. With the selected fractional division, ⅓, ⅔, between the mechanical first and second brakes 218, 220, it is noted that truck skew due to mechanical braking is always minimized since the most braking difference that can ever exist during mechanical braking operations as described herein is ⅓ of the total braking force, i.e., either the left brake alone or both the left and right brakes together.

Both parking brakes, the mechanical first and second brakes 218, 220, are immediately applied if either of the traction control brake release enable signals BRL1, BRL2, is absent or if the brake release CAN message is missing and the operator is not present as indicated by the lack of an operator present signal generated by the operator presence sensor 228. Both parking brakes, the mechanical first and second brakes 218, 220, are also immediately applied if the key switch 256 is in the off position or if the battery 252 is disconnected.

Under normal circumstances, the two traction motors, the left and right drive motors 202, 204, will provide all of the braking torque necessary to meet all regulatory requirements. However, these requirements may be exceeded under rare operating conditions such as service braking or inversion braking while traveling down a steep grade with a heavy load. For such circumstances, which result from the size of the traction motors and the capacity of the traction motor controller being insufficient to meet the excessive demands, additional braking torque may be applied to meet the requested deceleration rate. Since the system is closed loop and the deceleration rate is monitored continuously, the parking brakes can be used to assist in the service brake request if the deceleration rate is not within a given percentage, Z%, of the requested deceleration rate, for example 40%.

Since the braking system of the present application is designed to meet the normal service braking demands with the motors to eliminate mechanical brake wear and replacement of wear brake parts, the parking brakes will not be used to assist unless the operator of the truck has substantially or fully depressed the brake pedal 230 so that a predefined percentage of braking is requested, for example 80% to 100% braking is being requested. In the illustrated embodiment, 100% braking has to be requested for braking assistance. Likewise, during an accelerator controlled inversion braking operation, the parking brakes will not assist service braking unless the operator of the truck has fully depressed the accelerator to command maximum travel speed in the direction opposite to the current vehicle direction of travel. Once the truck's deceleration rate has been reduced to the requested rate, the mechanical braking assist is no longer required and the parking brakes are released. Parking brake assist is only available when the forks are lowered below the staging height.

Truck speed may also be monitored for providing mechanical braking assistance. For example, in rare instances, it is possible that the braking envelope of the traction motors and the capacity of the traction motor controller are unable to limit the speed of the truck to the maximum permitted speed due, for example, to grade, load, and operating conditions. Again, since the system is closed loop, vehicle speed is monitored and compared to the requested speed. If the feedback speed exceeds the maximum allowable speed by a predetermined amount, such as 1 MPH, the mechanical first brake 218 may be applied to provide ⅓ of the total parking brake capacity to aid in limiting the top speed of the truck. Again, speed controlled parking brake assist is only available with forks lowered below the staging height. All instances of parking brake assistance of service braking are intended to be used only on rare and unexpected occasions to prevent excessive wear of mechanical braking components.

Having thus described the invention of the present application in detail and by reference to preferred embodiments thereof, it will be apparent that modifications and variations are possible without departing from the scope of the invention defined in the appended claims.

What is claimed is:

1. A lift truck comprising:
   a first wheel located on a first side of said truck;
   a second wheel located on a second side of said truck opposite from said first side;
   at least one drive motor for driving said lift truck;
   at least one traction motor controller connected for controlling said at least one drive motor for both moving said truck and for braking said truck, said traction motor controller controlling said at least one drive motor to provide all conventional service braking for said truck;
   a first brake associated with said first wheel;
   a second brake associated with said second wheel;
   wherein said first brake applies a first braking force to provide backup braking, said first brake being operable alone;
   said second brake applies a second braking force to provide backup braking, said first braking force and said second braking force being unequal to one another; and
   a brake control for controlling said first and second brakes in the event of a failure resulting in loss of at least one signal for controlling said first and second brakes.

2. A lift truck as claimed in claim 1 wherein said first and second braking forces are based on vehicle geometry to reduce truck skewing.

3. A lift truck as claimed in claim 1 wherein said first braking force applied to said first side of said truck is equal to X % of a total braking force applied by said first and second brakes and said second braking force applied to said second side of said truck is equal to Y% of said total braking force so that X %+Y %=100% and X %≠Y %.

4. A lift truck as claimed in claim 1 wherein a total combined braking force applied by said first and second brakes is fractionally divided so that the braking force applied to one side of the truck is equal to a fraction X of said total combined braking force and the braking force applied to the other side of the truck is equal to a fraction Y of said total combined braking force so that X+Y=1 and X≠Y.

5. A lift truck as claimed in claim 1 wherein said first braking force applied to said first side of said truck is equal to ⅓ of a total braking force applied by said first and second brakes and said second braking force applied to said second side of said truck is equal to ⅔ of said total braking force, said first brake being applied alone or said first and second brakes both being applied so that the most side-to-side braking force difference that can exist during backup braking is ⅓ of said total braking force.

6. A lift truck as claimed in claim 1 wherein:
   said first brake comprises a first mechanical brake coupled to said first wheel;
   said second brake comprises a second mechanical brake coupled to said second wheel; and
   said brake control comprises a brake logic control module for controlling said first and second mechanical brakes.

7. A lift truck as claimed in claim 6 wherein said at least one drive motor for driving said lift truck comprises:
   a first drive motor for driving said first wheel; and
   a second drive motor for driving said second wheel;
   wherein said at least one traction motor controller is connected for controlling said first and second drive motors for both moving said truck and for braking said truck, said at least one traction motor controller controlling said first and second drive motors to provide all conventional service braking for said truck.

8. A lift truck as claimed in claim 6 wherein said brake logic control module operates said first mechanical brake alone upon loss of at least one signal for controlling said first and second brakes.

9. A lift truck as claimed in claim 1 further comprising a mast assembly along which forks are raised and lowered, and a mast height sensor, said at least one signal for controlling said first and second brakes comprising first and second brake release signals, said brake control releasing said first and second brakes in response to said first and second brake release signals, respectively, said brake control operating said first brake alone if either one of said first and second brake release signals is not received and said mast assembly is not above a staging height.

10. A lift truck as claimed in claim 1 further comprising a mast assembly along which forks are raised and lowered, and a mast height sensor, said at least one signal for controlling said first and second brakes comprising first and second brake release signals, said brake control releasing said first and second brakes in response to said first and second brake release signals, respectively, said brake control operating said first and second brakes upon any request for service braking if either one of said first and second brake release signals is not received and said mast assembly is not above staging height.

11. A lift truck as claimed in claim 10 wherein said brake control does not operate either of said first and second brakes if either one of said first and second brake release signals is not received, said mast assembly is above staging height and there is no operator request for service braking.

12. A lift truck as claimed in claim 1 wherein said lift truck further comprises a mast assembly along which forks are raised and lowered, and a mast height sensor, said at least one signal for controlling said first and second brakes comprising first and second brake release signals, said brake control operating both said first and second brakes after expiration of a predetermined time period after either one of said first and second brake release signals is not received and said mast assembly is not above a staging height.

13. A lift truck as claimed in claim 12 wherein said brake control does not operate either of said first and second brakes if said mast assembly is above staging height.

14. A lift truck as claimed in claim 1 wherein said lift truck further comprises an operator controlled service brake request device, a mast assembly along which forks are raised and lowered, and a mast height sensor, said at least one signal for controlling said first and second brakes comprising first and second brake release signals, said brake control applying said first and second brakes if truck deceleration is below a given percentage of a requested deceleration rate, said mast assembly is not above a staging height and said service brake request device is activated to a predefined percentage of maximum braking.

15. A lift truck as claimed in claim 1 wherein said lift truck further comprises an operator controlled accelerator which can be used to command acceleration and service braking, a mast assembly along which forks are raised and lowered, and a mast height sensor, said brake control applying said first and second brakes if truck deceleration is below a given percentage of a requested deceleration rate, said mast assembly is not above a staging height and said accelerator is activated to command maximum service braking.

16. A lift truck as claimed in claim 1 wherein said lift truck further comprises means for monitoring truck speed, a mast assembly along which forks are raised and lowered, and a mast height sensor, said brake control applying at least said first brake if truck speed is above a requested speed by a predetermined amount, said mast assembly is not above a staging height and a service brake request device is activated to a predefined percentage of maximum service braking.

17. A lift truck as claimed in claim 11 wherein said brake control operates said first and second brakes if either one of said first and second brake release signals is not received, said mast assembly is above staging height and there is an operator request for service braking.

18. A method for operating a lift truck having first and second wheels located on first and second sides of said truck, respectively, a first brake associated with said first wheel, a second brake associated with said second wheel, an operator controlled service brake request device, a mast assembly along which forks are raised and lowered, and a mast height sensor, said method comprising:
applying a first backup braking force with said first brake to said first side of said truck;
applying a second backup braking force with said second brake to said second side of said truck, said first braking force being unequal to said second braking force and able to be applied alone without said second braking force;
generating first and second brake release signals to release said first and second brakes, respectively, when said truck is to be operated;
monitoring said first and second brake release signals; and
reapplying said first braking force in response to failure to receive either said first or said second brake release signals and said mast assembly being below a staging height.

19. A method as claimed in claim 18 further comprising:
monitoring said service brake request device; and
reapplying said second braking force in response to a request for service braking.

20. A method as claimed in claim 19 further comprising:
timing a period from initial failure to receive either said first or said second brake release signals; and
maintaining application of said first brake and reapplying said second brake upon expiration of a predefined period of time from failure to receive either said first or said second brake release signals.

21. A method as claimed in claim 20 further comprising:
setting said first braking force to ⅓ of a total braking force that is applied when both said first and second brakes are simultaneously applied;
setting said second braking force to ⅔ of said total braking force; and
applying said first brake alone or applying both said first and second brakes so that the most side-to-side braking force difference that can exist during backup braking is ⅓ of said total braking force.

22. A method as claimed in claim 18 further comprising:
applying said first and second brakes if truck deceleration is below a given percentage of a requested deceleration rate, said mast assembly is not above a staging height and said service brake request device is activated to a predefined percentage of maximum braking.

23. A method as claimed in claim 18 wherein said lift truck further comprises an operator controlled accelerator which can be used to command acceleration and service braking, said method further comprising:
applying said first and second brakes if truck deceleration is below a given percentage of a requested deceleration rate, said mast assembly is not above a staging height and said accelerator is activated to command maximum service braking.

24. A method as claimed in claim 18 wherein said lift truck further comprises means for monitoring truck speed, said method further comprising:

applying at least said first brake if truck speed is above a requested speed by a predetermined amount, said mast assembly is not above a staging height and said service brake request device is activated to a predefined percentage of maximum braking.

\* \* \* \* \*